Jan. 17, 1961 R. JOHNSON 2,968,689

TELEPHONE SERVICE FITTING FOR FLOOR DISTRIBUTION SYSTEMS

Filed Jan. 6, 1958 3 Sheets-Sheet 1

INVENTOR.
Robert Johnson
BY Emery, Whittemore
Sandoe & Dix
ATTORNEYS

TELEPHONE SERVICE FITTING FOR FLOOR DISTRIBUTION SYSTEMS

Filed Jan. 6, 1958

INVENTOR.

Robert Johnson

BY Emery, Whittemore, Sandoe & Dix.

ATTORNEYS

INVENTOR.
Robert Johnson
BY Emery, Whittemore
Scandoe & Dix
ATTORNEYS

United States Patent Office 2,968,689

Patented Jan. 17, 1961

2,968,689

TELEPHONE SERVICE FITTING FOR FLOOR DISTRIBUTION SYSTEMS

Robert Johnson, Edgeworth, Pa., assignor, by mesne assignments, to H. K. Porter Company Inc., Pittsburgh, Pa., a corporation of Delaware Filed Jan. 6, 1958, Ser. No. 707,330

8 Claims. (Cl. 174—48)

This invention relates generally to housings and assemblies for the termination of a multiplicity of conductors and particularly to a novel and improved junction assembly for use with telephone handsets.

The commonly used type of junction box for business telephone handsets normally consists of a terminal block and simple cover and base arrangement which is affixed to the side or base of a desk upon which the telephone handset is located. The cable, which is incoming to this junction box, originates in a cable raceway which is normally in the wall, ceiling or floor of the room and which normally leaves the raceway through a gooseneck fitting and is snaked to the junction box affixed to the desk. The cord outgoing from the junction box extends up and over the desk to the telephone handset.

This arrangement poses a variety of problems for the kind of business organization which may be subject to constant change of personnel and rearrangement of office furniture and particularly for that type of business organization using modular office construction adapted for quick and easy rearrangement. Any movement of a desk having a telephone handset thereon requires that the junction box be removed from the desk to prevent strain on the incoming cable and that it be reaffixed when the move is completed. Even the simple requirement of changing the telephone instrument from one side of a desk to the other, requires that the junction box be relocated onto the other side in order to avoid the inconvenience and untideness of having the outgoing cord extend across the working area of the desk.

The requirement that a maintenance man perform both the removal and reinstallation of the junction box, perhaps at separated periods of time and often after business hours, imposes an appreciable expense upon the user. In addition, the lack of flexibility in the usual rigid gooseneck fitting on the incoming cable leading from the cable raceway is an annoyance; and, in the case where the desk must be moved any appreciable distance, a new incoming termination is required.

It is the overall object of this invention to incorporate novel features in a housing for terminating connections to a telephone handset to eliminate the foregoing problems due to limitations inherent in housing presently used and thereby to enable installation of the housing in a more convenient and more accessible location, to permit movement and adjustment of the housing when so located, and to simplify the task of the telephone installer in making wiring connections on the termination apparatus portion of the housing.

Accordingly, it is a principal object of this invention to facilitate the inter-connection of conductors within a housing and thereby to simplify and expedite the work performed by a telephone installer.

It is a specific aspect of the principal object of this invention to afford an installer ready access to conductor connections within a service housing, thereby to enable an installer more easily to see and to trace individual conductors and their inter-connections.

Another specific object is to enable the installer to simply remove the terminating apparatus completely from the housing and, when necessary, to rotate it within the housing into a position where maintenance work can be accomplished most easily and efficiently.

Another principal object of this invention is to eliminate the fixed position characteristic of housings for the termination of telephone cable.

An additional object of this invention is to combine flexibility of housing location with protection of conductor terminations from damage due to moisture and other elements in any such location.

A feature of this invention is a pivotal and removable terminal block mounting plate affording easy access to terminal connections.

A related feature is a terminal block mounting plate of configuration to facilitate the ready fanning distribution of conductors from one side of the plate to the other.

Another feature of this invention is a base having adjustable conduit entrance means which permits the base to be slid from side to side depending on the location desired.

An additional feature of this invention is the mounting arrangement of cover and base in recessed relation to preclude the entrance of moisture into the area of terminal connections.

A particular feature is the combination in a service fitting of a generally box-like structure comprising a cover in recessed relation to a base to provide a somewhat sealed container, a removable and pivotal plate inside said box to facilitate manual operations within the box, removable insulating blocks mounted on both sides of said plate to permit fan-out of conductors on both sides of said plate, terminal lugs mounted on said blocks to enable flexible interconnections of said conductors, and conductor cable or conduit box entrance means adjustable independently of the box position to alleviate usual problems of constant cable movement every time the box may be relocated.

Other objects, features and advantages of the invention will appear or be pointed out as the description proceeds.

In the drawings, forming a part hereof, in which like characters indicate corresponding parts in all the views.

Figure 1:
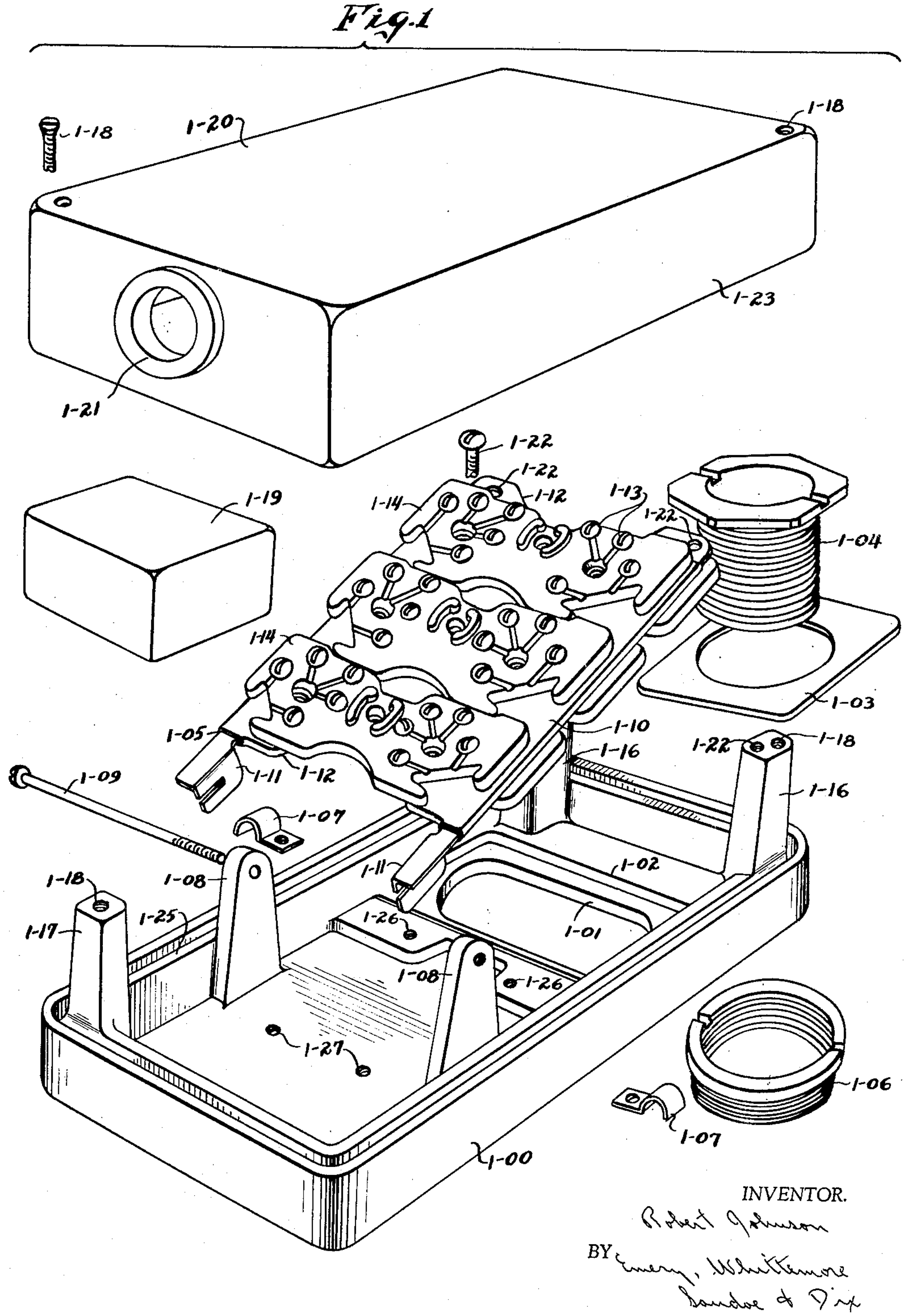
Figure 1 is an exploded, perspective view showing the telephone service fitting of this invention.

Referring to Figure 1, the base of the assembly, identified by numeral 1–00, is a cast or pressed metal member preferably of aluminum and of generally rectangular shape. The base 1–00 is arranged to define an elongated opening 1–01 having semi-circular end portions and a major axis perpendicular to the longer sides of the base 1–00. Reference numeral 1–01 is applied to this opening and its side walls, which walls are preferably of the thickness of the bottom piece portion of the base 1–00 and of smooth surface, forming two parallel walls perpendicular to the longer sides of the base and having semi-circular end wall portions. A raised lip portion 1–02 is provided around or along the elongated opening within the base; and a flat washer 1–03, which rests when assembled on the surface area between the hole 1–01 and lip 1–02, may be slid along the major axis of the elongated hole 1–01. The washer 1–03 has an opening in the center thereof of a diameter slightly less than the minor axis of the elongated hole 1–01 and said opening is of a size to accommodate the threaded portion of the standard conduit nipple identified by numeral 1–04.

Figures 2, 3, 4:
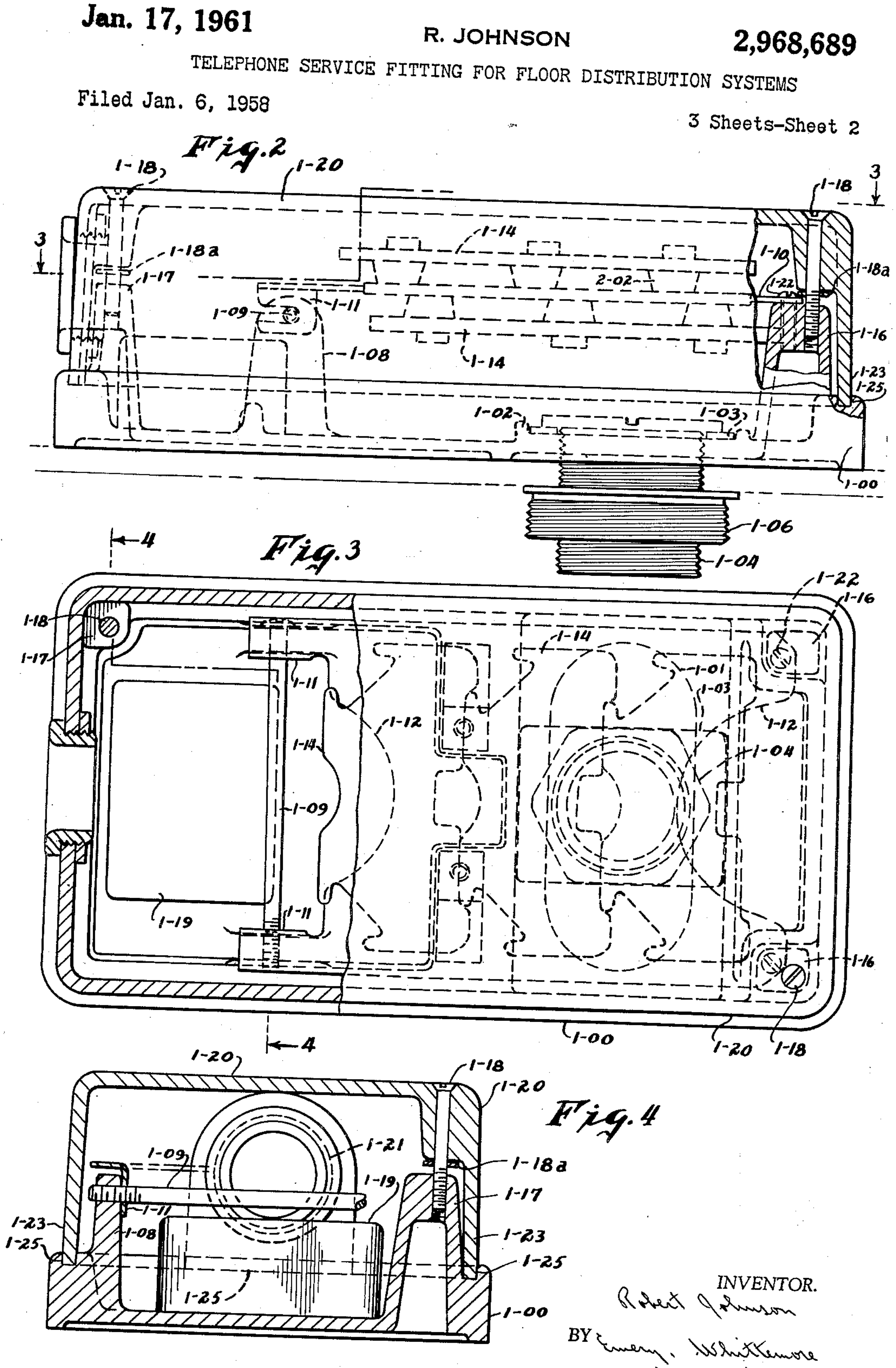
Figure 2 shows a detailed right-hand elevation view of the assembly of Figure 1 with a fragmentary cross-section view of one end thereof.
Figure 3 shows a detailed top view of the complete assembly of Figure 2 taken along the line 3—3 of Figure 2.
Figure 4 shows a cross-sectional left-hand end view looking along line 4—4 of Figure 3.
Figures 5, 6:
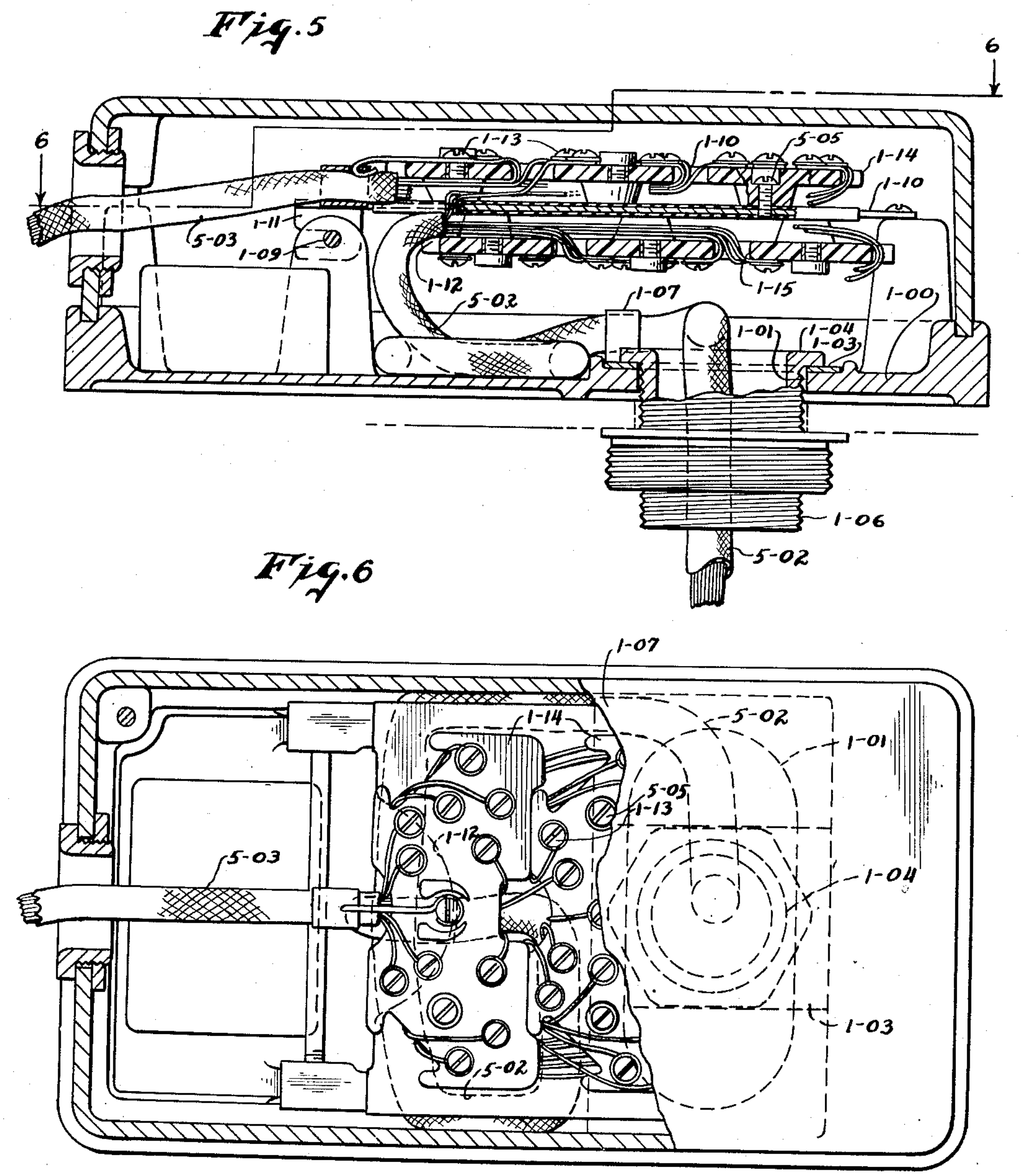
Figure 5 is a cross-sectional view of Figure 2 with illustrative details of terminal blocks 1–13, a connection plate and cables in place.
Figure 6 shows a top view of Figure 5 partly in plan and partly in exposed section, looking along the line 6—6 of Figure 5.

In assembly, the washer 1–03 is placed over the elongated hole 1–01 and the nipple 1–04 is inserted through the opening thereof so that the flat flanged upper portion of the nipple 1–04 rests on the washer 1–03, and so that the threaded portion of the nipple 1–04 extends below the base 1–00. Then an adapter 1–06 is threaded onto the below-base-projecting threaded portion of the nipple 1–04. This adapter 1–06 has an outer diameter greater than the minor axis of hole 1–01 and consequently, when it is screwed onto the nipple 1–04, its upper flat surface will bear against the base 1–00, thereby to hold the assembly of the nipple 1–04 and the washer 1–03 in a fixed positoin. This fixable position may be varied by simply loosening the adapter 1–06, sliding the assembly of the washer 1–03 and the nipple 1–04, and retightening the adapter 1–06. Elevation views of this completed assembly are shown in Figures 2 and 5, described hereinafter; and plan views thereof, showing the relative dimensions of the components 1–03, 1–04, 1–06 and the hole 1–01, are shown in Figures 4 and 6, described hereinafter.

Cable clamps 1–07 are utilized to clamp the incoming cable, identified by numeral 5–02 in Figure 5, in a particular manner, as will be described hereinafter in connection with Figure 5, and these clamps may be attached to the base at a desired location, determined by the positioning of cable clamp mounting holes 1–26.

Support members 1–08, cast integrally with the base 1–00 or otherwise firmly attached thereto by screws or spot welding, have holes drilled and tapped in their upper portions. A threaded bolt 1–09 is of a diameter to extend through the holes in support members 1–08. In assembly, bolt 1–09 is inserted through one of the members 1–08 and is then screwed into the other of the members 1–08. This latter assembly of bolt 1–09 and support members 1–08 is shown in exposed plan and cross-sectional views of Figures 3 and 4, respectively, described hereinafter.

The connecting block mounting plate 1–10, preferably of steel material finished by electrical galvanizing and given a rubberized coating 1–05. is provided with depending portions 1–11 at one end thereof. Each such depending portion 1–11 has a slotted opening therein of size to accommodate a threaded bolt 1–09. When said depending members are mounted on the bolt 1–09 by means of the slots therein, a plate 1–10 may then be rotated about bolt 1–09 as a pivot point. This mounting arrangement is shown in detail in the elevation and exposed plan views of Figures 2 and 3, respectively.

Terminal blocks 1–13, comprising a plurality of connecting lugs identified by numerals 1–14, are affixed to the connecting plate 1–10 by means of screws inserted through each block and threaded into pierced and tapped holes 1–15 of the connecting plate 1–10, as is shown more clearly in elevation and cross-section in Figures 2 and 5, described hereinafter. The plate 1–10 also has two drilled openings at its other end to accommodate screws 1–22 and these openings are similarly labeled 1–22. Plate 1–10 is also arranged to define semi-circular end portions 1–12 to provide clearance for the incoming cable conductors, as is shown and described hereinafter in connection with Figures 5 and 6.

Support members 1–16, cast integrally with or otherwise firmly connected to base 1–00 by screws or spot welding, have holes tapped and drilled therein to accommodate the screws 1–22, and are similarly labeled. When the plate 1–10 is rotated around the threaded bolt 1–09 to a horizontal position, by means of the depending slotted portions 1–11 at one end thereof, the two holes 1–22 in the other end of the connector block mounting plate 1–10 will line up with the holes in support members 1–16 on which the plate 1–10 will rest, and screws 1–22 may be inserted therethrough and threaded into the members 1–16. Thus, the plate 1–10 may be freed from its connection from support members 1–16 by removing the screws 1–22 and may then be rotated around the bolt 1–09 as a fulcrum to a raised position or may be completely removed from connection with the base 1–00 by the removal of the threaded bolt 1–09 and the screws 1–22. The holes in the plate 1–10 and the support members 1–16 which accommodate the screws 1–12 are identified by identical numerals for convenience and simplicity in understanding the detailed drawings, particularly Figures 2 and 6, which show in elevation and cross-section the connection of the plate 1–10 to the support members 1–16 by screws 1–22.

A third support member 1–17 has a hole drilled and tapped therein, as does the diagonally opposite one of the two support members 1–16, to accommodate a screw 1–18. These latter holes in the support members 1–17 and 1–16, for accommodating the screw 1–18, are also identified by numeral 1–18. A buzzer 1–19, which may be of a type well known in the telephone art, is mounted by screwed connections to the base 1–00 by means of tapped holes 1–26.

A cover 1–20, which is preferably of aluminum construction and of generally rectangular shape, has an opening for a cord, and a bushing and locknut at the opening and of a type well known in the art, identified by the numeral 1–21. The cover 1–20 is also arranged to define two holes located at diagonally opposite corners thereof, of a size to accommodate screws 1–18, identically identified. A fiber washer 1–18*a*, jammed on each screw 1–18, prevents the screw 1–18 from falling out of the cover when the cover is removed and turned upside down. The base 1–00 has a continuous depressed groove 1–25 along the upper periphery thereof. The vertical depending edge 1–23 of cover 1–20 fits into groove 1–25 of base 1–00 to form a water-tight seal, as is shown in cross-section in Figures 2, 4 and 5, later described. The cover 1–20 is installed on the base 1–00 so that conduit opening 1–21 is adjacent to the mounted buzzer 1–19, and said cover is held in position by the two screws 1–18 threaded into similarly identified openings in support members 1–16 and 1–17, as is shown in cross-section in Figures 2 and 4, described hereinafter.

From the foregoing description of the exploded assembly perspective view of Figure 1, the simplicity, adaptability, flexibility and utility of this invention is readily apparent. For instance, an installer may simply remove the cover 1–20 by removing the two screws 1–18 and then may work directly on the terminal blocks 1–13 and if necessary or desirable, he may then remove the plate mounting screws 1–22 and rotate the plate 1–10 around the fulcrum bolt 1–09 to an upright position, or he may also remove the fulcrum bolt 1–09 and completely remove the connector plate 1–10 from the housing assembly. This invention may be utilized with well known conventional conduit raceways. When installed, the service fitting of the present invention may be adjustably moved and the water-tight mounting arrangement of said fitting protects against damage to terminal connections from water and cleaner fluids applied to the area surrounding said installed fitting.

Referring now to Figure 2, the assembly of the washer 1–03, nipple 1–04 and adapter 1–06, as disposed in the hole 1–01 of the base 1–00, is shown in detailed elevation view. Nipple 1–04 is shown inserted through the flat washer 1–03, which rests on the portion of the base 1–00 which defines the elongated opening 1–01. The adapter 1-06 is shown threaded onto the nipple 1-04 but is not shown turned to the point where it bears against the base 1-00 and therefore the assembly may be moved transversely (in or out of the drawing of Figure 2) of the base.

Figure 2 also illustrates in elevation the removable and pivotable mounting arrangement of the plate 1-10. This connecting block mounting plate 1-10 is shown rotated, by means of slots in depending edges 1-11, around the bolt 1-09 to a horizontal fixable position. The connection of the mounting plate 1-10 to the support members 1-16 by means of the screws 1-22, is illustrated in exposed detail for one of the screws 1-22. The other screwed connection 1-22 is shown in dotted relief in the upper right-hand corner of Figure 3. Terminal blocks 1-14 are shown in dotted relief and the depending portion of these blocks, through which screws 5-05 are inserted into tapped holes 1-15 of plate 1-10, are identified by the numeral 2-02. A cross-sectional view through depending portions 2-02 of terminal blocks 1-14, to illustrate the mounting arrangement, is shown in Figure 5.

The cover 1-20 is shown in Figure 2 to be held in place by means of screws 1-18 inserted through the diagonally opposed openings in the top thereof and into the support member 1-16 at the right-hand end in cross section and into member 1-17 at the left-hand end in dotted elevation. It is to be noted that removal of screws 1-18 permits cover 1-20 to be removed, exposing connector plate 1-10 and that subsequent removal of screws 1-22 and then bolt 1-09 allows plate 1-10 to be rotated counter-clockwise in Figure 2 to a raised position for convenient access to the terminal blocks on the underside of the plate 1-10. The water-tight seal arrangement of the assembled housing is illustrated in cross-section in the lower right-hand corner of Figure 2. One of the vertical depending edges 1-23 of the cover 1-20 is shown resting in a continuous groove 1-25 of the base 1-00. A similar cross-sectional view of the fit of the other depending edges 1-23 into continuous groove 1-25 around base 1-00, appears in Figures 4 and 5 to complete the showing of the continuous seal.

Figure 3 shows in dotted plan, in relation to the corresponding elevation view of Figure 2, the relative dimensions of the assembly components comprising the washer 1-03, nipple 1-04, adapter 1-06 and the elongated hole 1-01 in the base 1-00, hereinafter described in connection with Figure 1. A plan view of the plate 1-10, corresponding to the elevation view of Figure 2, and an exposed plan view looking along line 3—3 of Figure 2, of the mounting arrangement of the depending edges thereof 1-11 and bolt 1-09 are shown. The screwed connection of the plate 1-10 to both support members 1-16 by means of the screws 1-22 is shown in plan, and the cross-sectional view of one in Figure 2 is illustrative of both. Semi-circular ends 1-12 of the plate 1-10 are shown in dotted plan and the relationship of the opening between and defined by the terminal blocks 1-14 to the semi-circular openings 1-12 thereunder, may be observed and the importance of this relationship to the fanning of conductors on either side of plate 1-10 to terminate in lugs on blocks 1-14, will be described with relation to the corresponding cross-sectional elevation view of Figure 5. In the exposed plan section view it is to be noted that the distance between the flat slotted portions of the depending edges 1-11, mounted on the bolt 1-09 which is inserted through the top support and threaded into the lower support 1-08, is slightly less than the distance between the inner flat surface of the support members 1-08, and this relationship is further illustrated in cross-section in Figure 4.

A cross-section through the support column 1-17, in the upper left-hand corner of Figure 3 looking along the line 3—3 of Figure 2, shows the screw 1-18, which holds the cover 1-20 in place, in the opening thereof. The diagonally opposite mounting screw 1-18, inserted through the cover 1-20 into the support member 1-16, is shown in plan view in the right lower corner of Figure 3. The bushing and lock nut connection 1-21 is also shown in cross section. The buzzer 1-19 is shown positioned in an open area of the base 1-00.

In Figure 4, a cross-section end view along line 4—4 of Figure 3, corresponding to the elevation cross-section view of Figure 3, illustrates the connecting relation of bolt 1-09 and a depending edge 1-11 of plate 1-10, and shows bolt 1-09 threadably inserted into one of the support members 1-08, as referred to and described in relation to Figure 3. Figure 4 also shows a cross-section through the other corner screwed mounting connection of cover 1-20 which is diagonally opposite in plan view to that one corner shown in cross-section in Figure 2, thereby to complete the illustration of the mounting arrangement of cover 1-20. The water-tight seal arrangement of the longer sides of the cover 1-20 and the base 1-00 by means of the continuous groove 1-25; and, the relative dimensions of the lock nut and housing connection 1-21 disposed in the opening defined by cover 1-20, are also apparent from Figure 4.

Figure 5 shows a longitudinal cross-section of the assembly, corresponding to the elevation view of Figure 2, with the incoming cable 5-02 and outgoing cord 5-03 exposed. The plate 1-10 is shown in longitudinal cross-section taken through the semi-circular openings in the ends thereof. A cross-section through one of the depending portions 2-02 of the terminal blocks 1-14, and a screw 5-05 disposed therethrough, and into the tapped hole 1-15 of the plate 1-10, illustrates the manner in which the terminal blocks 1-14 are affixed to either side of the plate 1-10. The cable 5-02 is shown entering the base 1-00 vertically, through the entrance means assembly disposed in the elongated hole 1-01 defined therein, making a right-angle bend to run parallel to the bottom of the base and transverse of the longer sides of base 1-00; and then making a radial bend to run parallel to the base and parallel to one of the longer sides thereof where it is restrained from movement by the cable clamp 1-07 mounted adjacent to that longer side. This radial bend configuration of cable 5-02 may be more readily observed in the corresponding plan view of cable 5-02 in Figure 6. Cable 5-02 is disposed in a spiral bend between cable clamp 1-07, affixed to the base 1-00, and the semi-circular opening 1-12 of the plate 1-10 where the conductors leave the cable and fan out on either side of the plate 1-10.

A corresponding plan view of this spiral bend in cable 5-02 is shown in Figure 6. Thus, when cover 1-20 and screws 1-22 are removed, the plate 1-10 may be rotated counter-clockwise (looking at Figure 5) about the bolt 1-09, and the cable 5-02 will unwind from the spiral bend. When the plate 1-10 is rotatably returned to its fixable position, the cable 5-02 is depressed to the position shown in Figures 5 and 6 so as not to interfere with the plate 1-10. Similarly, when the plate 1-10 is removed from the housing, cable 5-02 will unwind, but in this case also, no strain is placed on the cable incoming through the base 1-00 because of the unwinding and because of the fact that the cable clamp 1-07 restricts movement of that portion of cable 5-02 to the right of the clamp in Figures 5 and 6.

Figure 6 is a partially exposed and cross-section plan view looking along line 6—6 of Figure 5, and shows the manner in which conductors from cable 5-02 and cord 5-03 may separate and fan out on either side of the plate 1-10. Conductors from the cable 5-02 and cord 5-03 are shown terminating in lugs 1-13 on terminal blocks 1-14 on the topside of plate 1-10.

Although a specific embodiment of the invention has been shown in the drawings and described in the foregoing specification, it will be understood that the invention is not limited to the specific embodiment but is capable of modification, substitution and rearrangement of parts and elements without departing from the invention as defined in the claims.

What is claimed is:

1. A service fitting comprising in combination a rectangular base having an opening therein, a pair of mounting posts affixed to said base and disposed opposite one another on each of the longer sides of said base, said posts having cylindrical openings in the upper portions thereof with a center line therethrough perpendicular to the longer sides of said base, a first removable threaded bolt insertable through said post openings, a second pair of mounting posts disposed in adjacent corners of a short side of said base and having threaded holes in the upper surfaces thereof, a rectangular plate having each of the longer edges thereof at one end of said plate terminating in slotted depending pieces adaptable to be rotatably accommodated by said first threaded bolt, said plate having the shorter edge at the other end thereof recessed to provide clearance for passage of conductors around the edge of the plate, and said other end having its side portions with opening therein so disposed that when said depending slotted edges are mounted on said threaded bolt and said plate is rotated to a fixable position, the side portions of said other end of said plate will rest on said second mounting posts and position the openings in the side portions of said plate over the openings in said second mounting posts, second removable bolts for fastening said plate to said second posts when said plate is rotated to its said fixable position, said first bolt cooperating with the slotted depending portions at one end of said plate to enable rotation of said plate away from its said fixable position when said second bolts are removed, said plate being removable from said base when said first and second bolts are removed.

2. A service fitting comprising in combination a base member having a rectangular bottom piece having an elongated opening therein and four connecting sides extending vertically from said bottom piece, said connecting sides of said base each having a top surface forming a groove so disposed that said groove is continuous along the top surface of said sides, three mounting posts each forming a threaded opening in the center thereof and each affixed to said bottom piece at one of the three intersections of said sides, a pair of vertical support members affixed to said bottom piece and oppositely disposed parallel to the two longer sides of said base member and having threaded openings therein with a center line perpendicular to said two longer sides of said base member and parallel to said bottom piece, a conduit nipple slidably disposed on said bottom piece so as to have a portion thereof extend through the elongated opening formed in said bottom piece, a removable threaded bolt adapted to be inserted through the openings formed in said vertical support members, a rotatable flat rectangular plate having the longer edges thereof terminating in two slotted depending pieces adaptable to rotatably accommodate said thread bolt, said plate defining semi-circular openings at the centers of the two shorter sides thereof, a rectangular cover member having a top piece forming a hole in at least three of the corners thereof and having vertically depending sides adapted along the lower periphery thereof to fit into the continuous groove formed in said base, said cover defining in one of the shorter sides thereof an opening adapted to accommodate conductors therethrough, said cover member being so disposed with relation to said base that the three holes formed in said top piece align with the threaded openings formed in said mounting posts of said base member and the opening formed in said cover member is in a position adjacent to the shorter side of said rotatable plate having the depending slotted edges thereon when said sides of said cover fit into said continuous groove formed in said base, and a plurality of terminal blocks affixed to either side of said plate, said blocks having connecting lugs adapted to terminate conductors spread on either side of said semi-circular opening formed in said hinged edge of said rotatable plate.

3. A service fitting comprising a rectangular base member having a flat bottom wall with an elongated opening therein, the opening having a major axis transverse of said base member and a minor axis longitudinal of said base member, a flat washer plate having an opening therein slightly less in diameter than the minor axis of said elongated opening and slidably attached to said base adjacent to said elongated opening, a conduit nipple adaptable to accommodate conduit therethrough having an upper flat portion greater in diameter than said minor axis of said elongated opening and a lower cylindrical threaded portion of diameter slightly less than the opening in said flat washer, said nipple having its flat portion disposed on said washer and its lower portion extending therethrough, an adapter piece having a threaded inner surface of diameter to accommodate the lower portion of said nipple and an outer surface of diameter greater than the minor axis of said elongated opening with a flat top portion, means for turning said adapter on said nipple to bring said adapter flat top portion into bearing relation with said base, a flat plate, a hinge having an axis extending transversely of the base member and connecting one end of the plate to the base for swinging movement between a raised position and a lowered position in which the plate is generally parallel to the base member and extends across the elongated opening and for a substantial distance beyond said opening longitudinally of the base member, a plurality of terminal blocks affixed to the upper and lower sides of said plate for terminating conductors contained in a conduit extendible through said nipple, and means supporting the plate, when in its lowered position with the lower terminal blocks spaced from the base member to leave a clearance for a cable under the plate, the hinged end of the plate being at a substantial distance from the elongated opening and the nipple whereby space in said clearance is provided for a cable from the nipple to pass across the bottom fitting and close to the hinge and then back to terminal blocks on the plate whereby the plate can swing upward when the wires of the cable are connected to said blocks.

4. A service fitting for a telephone system including a housing enclosing a chamber, the housing including a base forming a bottom of the chamber, and including also a cover detachably connected to the base and movable into an open position, a plate within the chamber, pivot bearings connecting one end of the plate with the housing, for movement about a pivot axis transverse of the housing and between a raised position and a lowered position, the plate being generally parallel to the bottom of the chamber when in lowered position, a support at the other end of the plate holding said plate spaced from the bottom of the chamber when the plate is in lowered position, the pivot bearings being intermediate the ends of the chamber to leave a space within the chamber beyond the pivoted end of the plate for a cable to bend along a long arc, and the pivot bearings being at a level substantially higher than the bottom of the chamber to leave space under the pivoted end of the plate, the base of the housing having a first opening therethrough located near the end of the plate remote from said pivoted end, a multi-conductor cable extending through said first opening toward the pivoted end of the plate and then folding back toward the other end of the plate with the fold of the cable in the space below the plate, the housing having a second opening in the end of the chamber beyond the pivot on the side remote from the first opening, another multi-conductor cable entering the chamber and extending across the space from the end of the chamber to the pivoted end of the plate with a length of cable that bends along a long arc to facilitate movement of the plate about the pivot bearings to provide access to the bottom surface of the plate.

5. The service fitting described in claim 4 and in which the pivot bearings are carried on standards extending up from and connected to the base, and the cover has an end wall and the second opening is through the end wall of the cover.

6. The service fitting described in claim 4 and in which the opening through the base is a slot extending transverse of the housing and there are a conduit extending through the slot for holding the multi-conductor cable, the housing and conduit being relatively movable to shift the conduit lengthwise along the slot, and fastening means for holding the housing and conduit in fixed relation to one another with the conduit at selected locations along the slot.

7. The service fitting described in claim 4 and in which there is a cable anchor on the base ahead of the location at which the cable folds and another cable anchor on the plate for holding the cable which extends through the second opening.

8. The service fitting described in claim 4 and in which the base has a low rim extending upwardly around its entire perimeter, and the cover has side walls extending downwardly and engaging the rim around the entire chamber along confronting faces of the rim and cover, one of the confronting faces having a projection which engages in a recess in the other confronting face.

References Cited in the file of this patent

UNITED STATES PATENTS

| | | |
|---|---|---|
| 522,664 | Kleinsteuber | July 10, 1894 |
| 835,039 | Slocum | Nov. 6, 1906 |
| 1,772,687 | Reinke | Aug. 12, 1930 |
| 2,374,622 | Rugg | Apr. 24, 1945 |
| 2,738,892 | Wiesmann | Mar. 20, 1956 |
| 2,813,143 | Weston | Nov. 12, 1957 |
| 2,854,166 | Hill | Sept. 30, 1958 |

FOREIGN PATENTS

| | | |
|---|---|---|
| 912,709 | France | Mar. 6, 1946 |